US008514774B2

(12) United States Patent
Ge et al.

(10) Patent No.: US 8,514,774 B2
(45) Date of Patent: Aug. 20, 2013

(54) TIME AND FREQUENCY SYNCHRONIZATION METHOD FOR OFDMA UPLINK RECEIVERS AND BASE STATIONS

(75) Inventors: Yiqun Ge, Beijing (CN); Wuxian Shi, Beijing (CN); Juan Du, Beijing (CN)

(73) Assignee: STMicroelectronics (Beijing) R&D Company Ltd., Beijing (CN)

( * ) Notice: Subject to any disclaimer, the term of this patent is extended or adjusted under 35 U.S.C. 154(b) by 1597 days.

(21) Appl. No.: 11/676,914

(22) Filed: Feb. 20, 2007

(65) Prior Publication Data

US 2007/0202903 A1 Aug. 30, 2007

(30) Foreign Application Priority Data

Feb. 28, 2006 (CN) .......................... 2006 1 0009351

(51) Int. Cl.
H04B 7/212 (2006.01)
H04B 7/19 (2006.01)
H04B 1/00 (2006.01)
H04W 4/00 (2009.01)

(52) U.S. Cl.
USPC .......... 370/328; 455/463; 455/13.2; 455/63.1

(58) Field of Classification Search
USPC ....................... 370/328; 455/463, 13.2, 63.1
See application file for complete search history.

(56) References Cited

U.S. PATENT DOCUMENTS 5,930,243 A * 7/1999 Parish et al. .................. 370/334
6,587,526 B1 7/2003 Li et al.
2003/0058953 A1 * 3/2003 Lee et al. ...................... 375/260
2004/0114507 A1 6/2004 Yoo et al.
2004/0233918 A1 * 11/2004 Larsson et al. ................ 370/400
2005/0002325 A1 * 1/2005 Giannakis et al. ............ 370/208
2005/0286547 A1 12/2005 Baum et al.

OTHER PUBLICATIONS

Fantacci, R., Marabissi, D., Papini S., Multiuser Interference Cancellation Receivers for OFDMA Uplink Communications with Carrier Frequency Offset, IEEE Communications Society, Globecom 2004, pp. 2808-2812.
Cao, Zhongren, Tureli, Ufuk, Yao, Yu-Dong, Honan, Patrick, Frequency Synchronization for Generalized OFDMA Uplink, IEEE Comunications Society, Globecom 2004, pp. 1071-1075.
Office Action with English translation for Chinese Patent Application No. 200610009351.4, filed Feb. 28, 2006, pp. 15, mailed Feb. 23, 2010.

(Continued)

Primary Examiner — Marisol Figueroa
(74) Attorney, Agent, or Firm — Hogan Lovells US LLP

(57) ABSTRACT

A method, and components for performing such method, is provided for synchronizing multiple user signals in a multi-user communication system. An interference matrix is generated based on time delay and frequency offset information for the active users accessing an OFDMA uplink receiver. User signals are received from the active users and are segmented into blocks, and the interference matrix is applied to each of the blocks. The received user signal is OFDM demodulated and un-used sub-carriers are discarded. Typically, the method includes also applying a factorization matrix formed by factoring a correction matrix created from the interference matrix and an inverse matrix formed based on the factoring results to the user signal blocks, e.g., the correction step includes multiplying each of the blocks from the user signal by each of these three matrices. The corrected user blocks are then concatenated to form a corrected vector signal.

20 Claims, 3 Drawing Sheets

(56) References Cited

OTHER PUBLICATIONS

Crussiere, M., Baudais, J-Y., Helard, J-F., New Iterative Time and Frequency Synchronization Scheme for MC-CDMA Systems over Power Line Channels, ISSSTA2004, Sydney, Australia, Aug. 30 Sep. 2, 2004, pp. 315-319.

Scaglione, Anna, Giannakis, Georgios B., Barbarossa, Sergio, Redundant Filterbank Precoders and Equalizers Part II: Blind Channel Estimation, Synchronization, and Direct Equalization, IEEE Transactions on Signal Processing, vol. 47, No. 7, Jul. 1999, pp. 16.

* cited by examiner

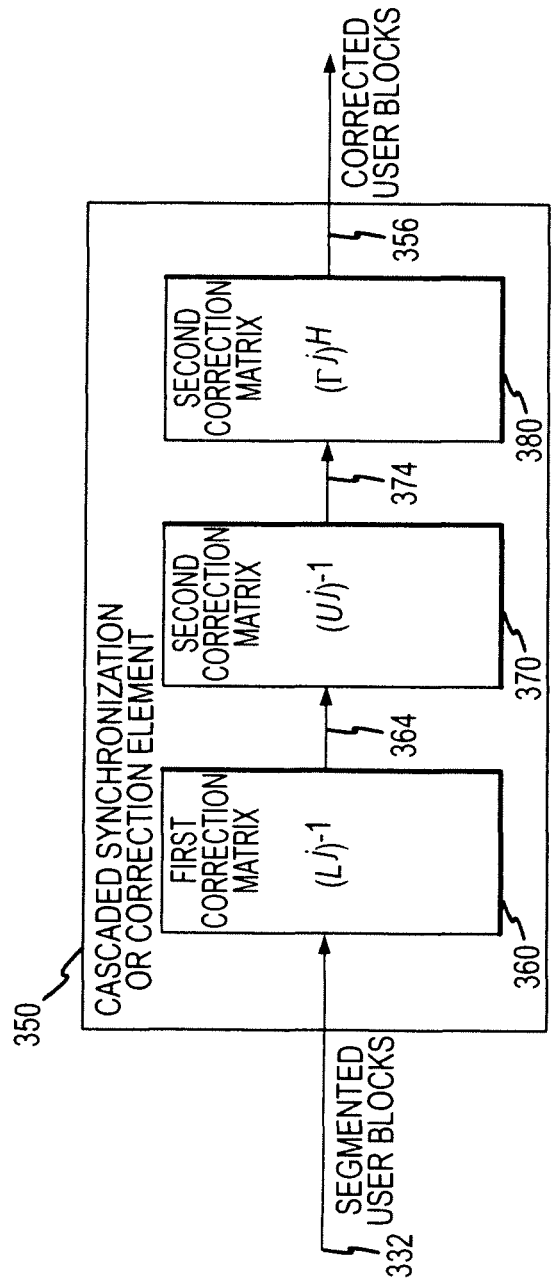

TIME AND FREQUENCY SYNCHRONIZATION METHOD FOR OFDMA UPLINK RECEIVERS AND BASE STATIONS

RELATED APPLICATION

The present application claims priority of Chinese Application No. 200610009351.4 filed Feb. 28, 2006, which is incorporated herein in its entirety by this reference.

FIELD OF THE INVENTION

The present invention relates, in general, to correcting synchronization errors in wireless communications between networked devices, and, more particularly, to software, systems, and methods for implementation at a receiver, such as an uplink receiver in an orthogonal frequency division multiplexing access (OFDMA) communication system or network, to correct synchronization errors due to time delays and frequency offsets that are present in uplink or in the backward link.

RELEVANT BACKGROUND

There are ongoing efforts to provide next generation mobile communications and to improve existing communications among networked devices including among wireless devices. A recent development has to been not only to do away wires or cables within a building or home but also to do away with the cables coming into the building or home. WiMAX technology (also known as 802.16 because it is based on the IEEE 802.16 WirelessMAN Standard for Wireless Metropolitan Area Networks) promises to allow this jump to more wireless communications that function as a wireless alternative to cable modems and DSL (Digital Subscriber Line). WiMAX will likely offer connectivity at up to 30 miles from an antenna at speeds up to 75 mbps (megabytes per second) and at higher rates or speeds under 5 miles, whereas a cable modem may only offer speeds of 1 mbps. As a result, where cable and telephone companies do not offer broadband Internet connections, WiMAX technology offers a way to provide broadband Internet, digital TV, and other digital communications with the use of a wireless antenna to pick up a WiMAX signal that is then distributed wireless (or with wires) throughout the local area by a base station (BS) to user terminals or devices (e.g., to subscriber stations (SSs)).

WiMAX supports a metropolitan area network (MAN) rather than a local area network (LAN) and assumes a point-to-multipoint topology. A controlling base station (BS) connects subscriber stations (SSs) not to each other but to various public networks that are linked to the base station. In this wireless communication system, a remote subscriber station (SS), such as a cellular or mobile telephone, accesses a network by sending an access signal to a base station (BS) or "uplinks." The access signal fulfills important functions such as requesting resource allocation from the BS, alerting the BS of the existence of the SS that is trying to enter the network, and initiating a process that allows the BS to measure some parameters of the SS (e.g., timing offset caused by propagation, frequency error, transmit power, and the like) that are maintained and adjusted to ensure a non-interfering sharing of the uplink resource (e.g., the BS). Unlike ordinary data traffic that is sent using scheduled resources that are allocated to the SS, the access signal for the SS is transmitted in an unsolicited manner and this process is often referred to as random access. This process may also be thought of as ranging because the access signal can help the BS to measure the propagation distance from the SS (i.e., its range) so that its transmission timing can be adjusted to ensure the signals from all the SSs are synchronized at the BS (i.e., uplink timing synchronization). Synchronization of the numerous, multi-user signals from the SSs has presented a number of problems that will be discussed after briefly describing transmission techniques or protocols.

OFDM (Orthogonal Frequency Division Multiplexing) technique has been widely proposed in many wireless systems to provide high data rate transmission. OFDM uses a set of overlapping but orthogonal sub-carriers to realize high spectrum efficiency. More recently, combined with TDMA (Time Division Multiple Access) and/or FDMA (Frequency Division Multiple Access), OFDMA (Orthogonal Frequency Division Multiple Access) has been proposed in many broadband wireless systems such as WiMAX systems. OFDMA can be divided into 2 types: sub-band OFDMA and interleaved OFDMA. In sub-band OFDMA, a set of consecutive sub-carriers along a frequency axis are allocated to a certain user so that signals from different users can be separated by filter banks at the receiver or BS side. Obviously, this type of OFDMA is sensitive to frequency-selective channel. To take advantage of channel diversity gain, interleaved OFDMA allocates a certain user a set of interleaved sub-carriers that allow a large sub-carrier spacing for each user making interleaved OFDMA more desirable for WiMAX.

However, synchronization issues may arise between a user device or subscriber station (SS) and a particular base station (BS) or its uplink receiver. For example, due to one or more of misalignments from an SS to a BS, discordance between the BS oscillator and an SS's oscillator(s), and Doppler effects, synchronization errors related to time delays and frequency offsets are often present in uplink. As with the OFDM technique, OFDMA is so vulnerable or susceptible to these synchronization errors that even a small frequency offset results in loss of orthogonality, and in OFDMA, time delays in the time domain often lead to complex exponential twiddles or variations in the frequency domain. Additionally, in contrast to downlink (or forward link), the received signals in uplink are subject to multi-user time delays and frequency offsets as multiple points or devices communicate with a single base station. Moreover, interleaved OFDMA complicates performing effective signal synchronization due to the interleaved sub-carriers. For instance, if two consecutive sub-carriers are allocated to two users, they may be subject to two different time delays and frequency offsets. The inter-channel-interference (ICI) between the two sub-carriers typically results in Multiple Access Interference (MAI) between the two users which can cause problems during synchronization.

More specifically, under one mandatory allocation scheme, a tile-based interleaved OFDMA is used in WiMAX communication system (e.g., as defined in IEEE802.16d/e Uplink). In this scheme, every four consecutive sub-carriers are grouped along a frequency axis, and this group is denoted as a tile. These tiles are interleaved in a given permutation base. Then, the interleaved tiles are regrouped into sub-channels by which radio resources are allocated to the users or SSs by the BS. In this manner, the data from one user are uniformly distributed onto the overall band. Besides, in order to take advantage of time diversity, the assignment scheme is rotated during transmission time. Tile-based interleaved OFDMA makes use of a ranging procedure to detect and adjust users' transmission parameters. Ranging can be divided into two types: initial ranging and periodic ranging. These ranging operations are completed interactively by the base station and users. Through the ranging procedure (initial and periodic), the time delay and frequency offset of an active user could be adjusted within an acceptable criterion, and a base-station could obtain a relatively accurate estimation of the residual time delays and frequency offsets of the active users. In this ranging, use of a loose criterion brings a relative long time delay and large frequency offset but needs less ranging signaling. In contrast, use of a strict criterion produces a short time delay and narrow frequency offset but needs more ranging signaling. Thus, in designing a robust base station receiver or uplink receiver, a significant problem that must be addressed is how to effectively and efficiently cancel the MAI (or correct for MAI) due to multi-user residual time delays and frequency offsets that can detrimentally effect synchronization at the base station.

A number of techniques have been suggested to address issues with MAI, but each has created new difficulties or has not adequately addressed the needs of the wireless communication industry. One suggested solution is applied to interleaved OFDMA uplink synchronization and involves the use of a banded interference matrix. The matrix is constructed with a priori knowledge of the frequency offsets of the users, and a correction matrix is generated based on least square (LS) algorithm. One insufficiency with this proposed solution is that it does not take into account time delays in constructing the banded interference matrix. Another disadvantage is that its high computational complexity makes it difficult to be implemented on an OFDMA system with a large number of available sub-carriers. This is important in WiMAX systems such as those defined by IEEE 802.16d/e as the assignment of the available sub-carriers to the users is frequently updated and a high complex computation of a correction matrix becomes inapplicable to real-time transmission.

In another proposed solution, SIC (Successive Interference Cancellation) and SPIC (Selective Parallel Interference Cancellation) algorithms are applied during OFDMA uplink synchronization. Under this proposal, even if there is no need to inverse a matrix, the algorithms are iterated with a channel estimator and demodulator. Due to the iterative feature, this proposal has a high complexity, which is so difficult to estimate that a stable latency implementation cannot be readily realized. Further, in this proposed solution, the self-distortions caused by time delay and frequency offset are unacceptably ignored. In another proposed solution, reference sub-carriers are allocated to every active user for synchronization in uplink. Code Division Multiple Access (CDMA) codes are transmitted on these reference sub-carriers. The base station receiver detects time delays and frequency offsets through the reference sub-carriers and requires the active users to adjust their transmission parameters through downlink until the active users are synchronized with base-station. This procedure is similar to the aforementioned ranging procedure. Unfortunately, it needs a long-time signaling to do synchronizations for each user. Besides, in a mobile system, the varying Doppler frequencies are difficult to adjust out making this proposal undesirable. Another proposed method allows transmitting upper and lower edge side-lobe canceling signals over respective sub-carriers nearest to sub-bands (including guard interval). At the receiver side, after inverse fast Fourier transform (IFFT) transformation, the canceling signals can reduce the MAI. This solution defines the algorithm of generating the upper and lower side-lobe canceling signals and the way to insert them into guard intervals, but a problem with this method is that it needs to change the signal transmission structure, which makes the method incompatible with standardized wireless communications (such as those defined by IEEE 802.16 or the like).

Hence, there remains a need for an improved uplink method and uplink receivers and base stations that incorporate such as method that address issues with MAI between multiple users or SSs that can prevent accurate synchronization at the uplink receiver or base station (BS). Preferably, such a method is designed to provide both time and frequency synchronization at an uplink receiver (e.g., an OFDMA uplink receiver) while having a low complexity and an acceptably small memory requirement.

SUMMARY OF THE INVENTION

The present invention addresses the above problems by providing a method (and corresponding software and hardware components) that has low complexity and low memory requirements yet provides effective time and frequency synchronization that is particularly suited for interleaved OFDMA in an uplink receiver. The method generally involves generating an interference matrix with respect to time and frequency synchronization errors, and in the interference or correction matrix entries corresponding to the unused sub-carriers are discarded or not included. In some embodiments of the invention, the correction matrix is banded and also fragmented into several smaller sized sub-matrices to reduce calculation complexity and provide memory savings. In most cases, the correction matrix is calculated based on a least square (LS) algorithm. In practice, another advantage of the technique is that the correction matrix can readily and quickly be updated as the sub-carrier assignments change with time.

The method of the invention provides a synchronization algorithm for use in processing a multi-user signal (or signals). The signal received in an OFDMA uplink receiver (e.g., at a base station or BS) is a multi-user, multiplexed signal, i.e., the signals from active users in a WiMAX or similar system are overlapped on the time domain. In principle, these user signals are non-overlapped and can be separated on the frequency, i.e., after OFDM demodulation (e.g., an FFT transform) at the receiver side. However, due to synchronization errors, such as various time delays and frequency offsets, the multi-user signals on the frequency domain after OFDM demodulation display too many distortions and interferences to be separated reliably. Thus, one objective of the present invention is to insert a synchronization module, e.g., in the uplink receiver or elsewhere in the BS or WiMAX network, that corrects these distortions and interferences on the "multi-user" frequency-domain signals issued from an OFDM demodulator. Multi-user separating on the frequency domain can be performed after this synchronization, which is effectively achieved with the synchronization method or algorithm (i.e., by operation of the inserted synchronization module) of the invention.

More particularly, a method is provided for synchronizing multi-user signals, which are overlapped on the time domain, in a multi-user communication system. The method includes generating an interference matrix based on time delay and frequency offset information for the active users in the communication system, such as those accessing a particular OFDMA uplink receiver. The method continues with receiving the overlapped signals from all of the active users (i.e., a multi-user signal), segmenting the overlapped signals or multi-user signal into a plurality of blocks, and then, applying the interference matrix to each of the blocks. The received multi-user signal is typically demodulated prior to the segmenting process and additionally it is processed such that identified un-used sub-carriers are discarded. The applying of the interference matrix may include first generating a correction matrix by applying a least square algorithm to the interference matrix and then multiplying each of the blocks by the correction matrix. In other embodiments, smaller dimension matrices are applied to cancel interference (such as MAI), and in these embodiments, a factorization matrix is formed by factoring the correction matrix and an inverse matrix is formed based on the factoring results. Then, the correction step (i.e., applying the interference matrix) includes multiplying each of the blocks from the multi-user signal by each of these three matrices. The corrected user blocks are then concatenated to form a corrected vector signal.

According to another aspect of the invention, a synchronization apparatus or element is provided for use in an interleaved OFDMA uplink receiver. The apparatus includes a module (e.g., hardware and/or software component(s)) configured for processing a multi-user signal vector to produce a plurality of blocks by removing un-used sub-carriers based on user assignments in the communication system in which the uplink receiver is operating (such as a WiMAX system configured according to the IEEE 802.16 standard). Another module is provided in the apparatus for sequentially outputting corrected blocks by multiplying each of the blocks by a correction factor, which has been previously generated for correcting both time delays and frequency offsets in the communication system. The apparatus further includes a module that concatenates the corrected blocks to form a corrected signal vector. In some embodiments, the correction factor includes a correction matrix formed based on time delay and frequency offset information for active users in the communication system. In other embodiments, three matrices are used instead of a single correction matrix, and these matrices include an interference matrix, a factorization matrix, and an inverse matrix. The interference matrix is typically a banded matrix selected to cancel interference such as MAI in the multi-user signal vector and has reduced dimensions because sub-channels or terms associated with un-used sub-carriers are not included in the interference matrix.

BRIEF DESCRIPTION OF THE DRAWINGS

FIG. 3 illustrates a cascaded implementation of the synchronization or corrected module of the invention, which may be used, for example, within the time and frequency synchronization unit of FIG. 2.

DETAILED DESCRIPTION OF THE PREFERRED EMBODIMENTS

The present invention is directed to communication methods (and components implementing such methods) for better handling signals (such as access signals that may be called a multi-user signal) from multiple user devices or subscriber stations (SSs). To this end, the invention provides a technique for achieving joint time and frequency synchronization between a base station receiving user signals and one or more SSs. The synchronization technique of the invention is particularly well suited for interleaved OFDMA wireless communication systems and even more particularly, for use in uplink receivers of base stations (BSs) within a communication system implementing tile-based, interleaved OFDMA uplink. To this end, the synchronization and/or correction technique generally includes correcting for or canceling Multiple Access Interference (MAI) due to multi-user residual time delays and frequency offsets.

Figure 1:
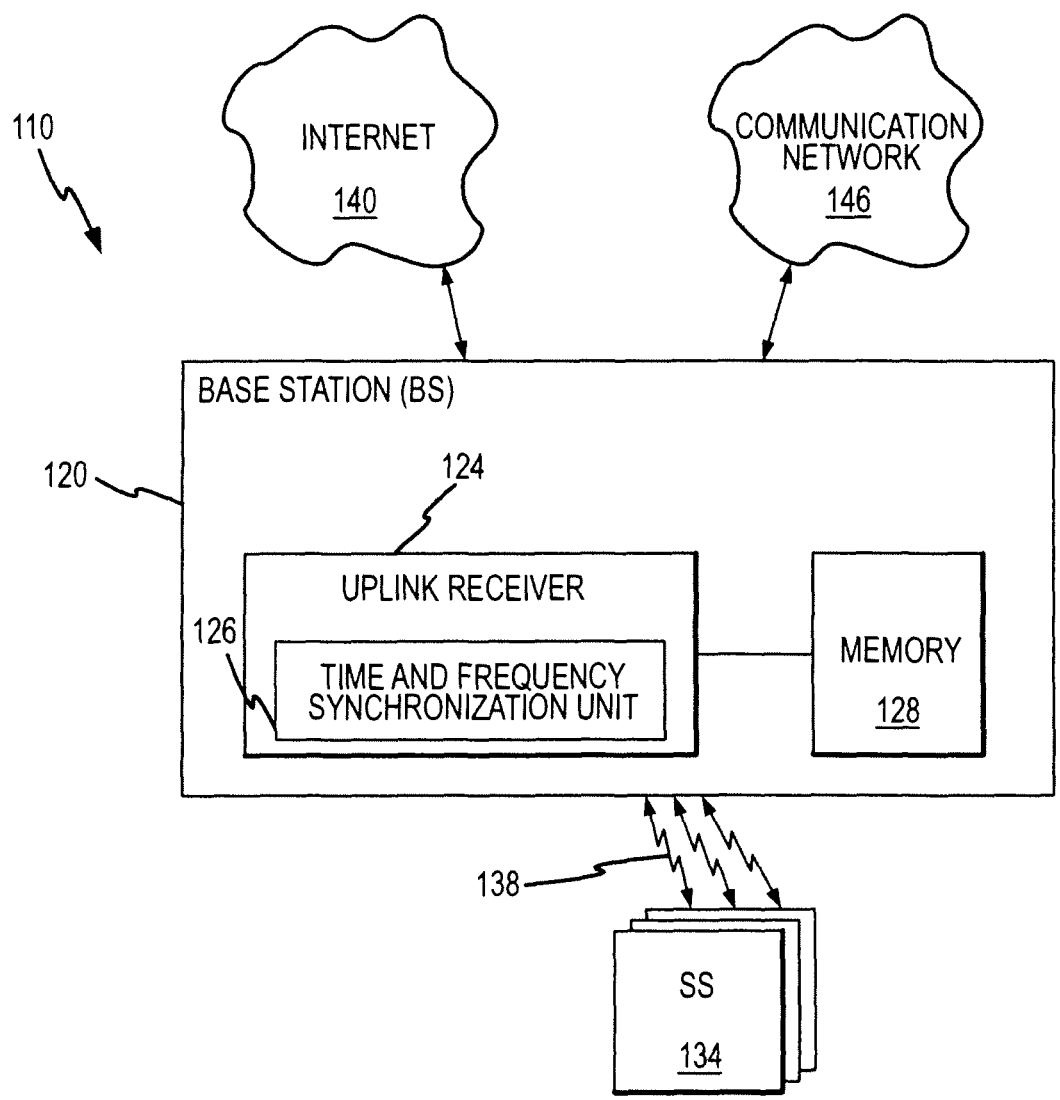
FIG. 1 illustrates in block diagram form a wireless communication system, such as an OFDMA-based network or system, with a base station having an uplink receiver configured according to the present invention.

FIG. 1 illustrates a communication system 110 in which the synchronization techniques of the present invention may be utilized. As shown, the system 110 includes a base station or BS 120 that is in communication with one or more public or private networks, e.g., Internet 140 and communication network 146, and in typical embodiments, the link to networks 140, 146 is a wired or wireless communication link, such as those defined between BSs and networks in IEEE 802.16 or the like (e.g., a WiMAX network-BS link). The BS 120 is also in communication via user or SS signals 138 with SSs 134, and again, the signals 138 may be wireless, random access signals or the like as defined by standards such as the WiMAX standard IEEE 802.16. The BS 120 includes an uplink receiver 124 and memory 128 which is accessible by the receiver 124. The uplink receiver 124 functions to synchronize signals 138 and to this end, includes a time and frequency synchronization unit 126. Operation of the synchronization unit 126 is discussed in great detail in the following description with reference to FIGS. 2 and 3 and is an important aspect of the invention. The particular configuration of the system 110 is not limiting to the invention, with the system 110 representing in general a representative WiMAX communication system, such as may be established to provide broadband Internet 140 or network access or digital TV access 146 in a wired or wireless manner for a plurality of users and/or SSs 134 via a base station 120.

To practice the invention, the computer, network devices, and communication devices, such as the user/client devices or subscriber stations (SSs) and base stations (BSs) may be any devices useful for providing the described functions, including well-known data processing and communication devices and systems such as computer systems, personal digital assistants, personal, laptop, and notebook computers and mobile computing devices with processing, memory, and input/output components, and server devices configured to maintain and then transmit digital data. Data typically is communicated in digital format following standard wired and wireless communication and transfer protocols, such as TCP/IP, HTTP, and the like, or IP or non-IP wireless communication protocols such as TCP/IP, TL/PDC-P, WSP, Bluetooth, IEEE 802.11b, 802.16 (WiMAX), and/or other IEEE standards, and/or other protocols or formats yet to be developed or evolved, but this is not intended as a limitation of the invention. Typical embodiments are configured to support synchronization/correction (such as MAI cancellation) in communication systems implementing tile-based, interleaved OFDMA of IEEE 802.16 and its ranging procedures but the teachings of the invention may be implemented in other communication systems such as those in which interference due to the presence of multi-user signals may be present and problematic.

As discussed in the following paragraphs, a synchronization algorithm for an interleaved OFDMA uplink receiver (such as is provided by synchronization unit 126 of uplink receiver 124) according to the invention preferably will: (a) synchronize the receiver with multi-user time delays (or misalignments) and frequency offsets; (b) allow for a low complexity and small memory consumption implementation; and (c) provide a stable latency for real-time processing. Use of an uplink receiver configured according to the invention has at least the following advantages: (a) it is a time and frequency joint synchronization as the time delay factor, i.e., complex exponential twiddle or variation, and frequency offset are alleviated by one synchronization procedure; (b) it is not an iterative algorithm such that a stable latency can be obtained; and (c) compared with the existing synchronization and cancellation algorithms, the inventors' proposal can significantly lower computational complexity and save memory consumption while maintaining acceptable performance.

In the following discussion significant aspects of the synchronization techniques are emphasized, and these include (but are not limited to): (a) the techniques not only alleviate frequency offset but also complex exponential twiddle; (b) the techniques discard the un-used sub-carriers so as to reduce the interference matrix's dimension; (c) in some cases, the interference matrix is segmented into several small-sized matrices, and the technique tackles or processes them one-by-one, which significantly lowers computational complexity and saves memory usage; (d) instead of outputting a complete correction matrix, the synchronization unit typically operates to output 3 matrices, one of which is banded one and although these outputs consume more memory (such as memory 128), the process avoids a multiplication of 2 matrixes to control complexity.

With this overview of a communication system 110 incorporating a synchronization unit 126 in an uplink receiver 124 and it advantages understood, an embodiment of a time and frequency joint synchronization algorithm or method will now be described in detail. This description includes listing of useful equations and, as will become clear, is defined in terms of interleaved OFDMA as this is believed to be one useful implementation of the synchronization method of the invention (e.g., for use in a receiver of a base station used for OFDMA uplink).

Considering first the multi-user interleaved OFDMA signal model, the available sub-carriers are firstly interleaved in a given manner and, then, grouped into sub-channels by which the radio resources are allocated by a base station for several simultaneous users or SSs along a frequency axis. To avoid band leakage, virtual sub-carriers are applied on both edges of the band and denoted as left guard and night guard. So, the number of the remaining available sub-carriers for data and pilots M shall be:

$$M = N - N_{left} - N_{right} - N_{DC} \quad \text{Equation 1}$$

where N is OFDM modulation size, $N_{left}$ is left guard size, $N_{right}$ is right guard size, and $N_{DC}$ is central frequency.

Each communication system may define its own scheme to (interleave and) group the disjoint sub-carriers into sub-channels (e.g., logic sets of several disjoint physical sub-carriers). To take advantage of frequency diversity, each sub-channel ($\Omega_i$) of the available sub-carriers has the same number of disjoint sub-carriers ($N_{subcarrier}$) that are uniformly distributed on the overall band. Furthermore, some systems allow for discarding some "bad" sub-channels.

$$\bigcup_i^{N_{subchannle}} \Omega_i + \bigcup_i^{N_{discard}} \Omega_i = \Omega \quad \text{Equation 2}$$

$$\Omega_m \cap \Omega_n = 0, \, m \neq n$$

where $N_{subchannel}$ is the total number of the used sub-channels and $N_{discard}$ is the number of the discarded sub-channels, so that M can be also given by:

$$M = N_{subchannel} N_{subcarrier} + N_{discard} N_{subcarrier} \quad \text{Equation 3}$$

where $\Omega_i^{(k)}$ is denoted as the allocation of the i-th sub-channel to the k-th user and $$\Omega^{(k)} = \bigcup_i \Omega_i^{(k)}$$

is designated for the set of the sub-channels for the k-th user.

In uplink, an active user k outputs its signal ($a^{(k)}$) onto the sub-channels ($\Omega^{(k)}$) assigned to it and zeros onto the other sub-channels, according to:

$$S_m^{(k)} = \begin{cases} a_m & m \in \Omega^{(k)} \\ 0 & \text{otherwise} \end{cases} \quad \text{Equation 4}$$

Without synchronization errors and white noise, the received OFDM symbol from the k-th user on the time domain is given by:

$$R^{(k)}[n] = \frac{1}{\sqrt{N}} \cdot \sum_{m=-\frac{M}{2}}^{\frac{M}{2}} S_m^{(k)} \cdot H_m^{(k)} \cdot e^{j\frac{2\pi \cdot m \cdot n}{N}} \quad \text{Equation 5}$$

where $H_m^{(k)}$ is the channel response on the m-th sub-carrier of the channel from user k to the base station and n is a sampling index.

The signals from $N_{user}$ users are multiplexed at the base station's receiver on time domain:

$$R[n] = \sum_{k=0}^{N_{user}-1} R^{(k)}[n] \quad \text{Equation 6}$$

$$= \frac{1}{\sqrt{N}} \cdot \sum_{k=0}^{N_{user}-1} \sum_{m=-\frac{M}{2}}^{\frac{M}{2}} S_m^{(k)} \cdot H_m^{(k)} \cdot e^{j\frac{2\pi \cdot m \cdot n}{N}}$$

Now, it may be useful to discuss the asynchronous signal model. Due to multi-user misalignments, time delays are present in uplink:

$$R^{(k)}[n - \tau_k] = \frac{1}{\sqrt{N}} \cdot \sum_{m=-\frac{M}{2}}^{\frac{M}{2}} S_m^{(k)} \cdot H_m^{(k)} \cdot e^{j\frac{2\pi \cdot m \cdot n}{N}} \cdot e^{-j\frac{2\pi \cdot m \cdot \tau_k}{N}} \quad \text{Equation 7}$$

where $\tau_k$ is the normalized time delay on the uplink from user k to the base-station.

The multiplexed signal then becomes:

$$R[n] = \sum_{k=0}^{N_{user}-1} R^{(k)}[n - \tau_k] \quad \text{Equation 8}$$

$$= \frac{1}{\sqrt{N}} \cdot \sum_{k=0}^{N_{user}-1} \sum_{m=-\frac{M}{2}}^{\frac{M}{2}} S_m^{(k)} \cdot H_m^{(k)} \cdot$$

$$e^{j\frac{2\pi \cdot m \cdot n}{N}} \cdot e^{-j\frac{2\pi \cdot m \cdot \tau_k}{N}}$$

Regarding the frequency offset of this asynchronous signal model, assuming that the frequency offset $\Delta f^{(k)}$ between the k-th user's transmitter and its base station's receiver has been synchronized within the domain of $(-0.5\Delta F, +0.5\Delta F)$ where $\Delta F$ is sub-carrier spacing through ranging procedures, the received signal from the user or SS can be expressed as:

$$R[n] = \frac{1}{\sqrt{N}} \cdot \sum_{k=0}^{N_{user}-1} e^{j\frac{2\pi \cdot \xi^{(k)} \cdot n}{N}} \sum_{m=-\frac{M}{2}}^{\frac{M}{2}} S_m^{(k)} \cdot H_m^{(k)} \cdot e^{j\frac{2\pi \cdot m \cdot n}{N}} \cdot e^{-j\frac{2\pi \cdot m \cdot \tau_k}{N}}$$
Equation 9 where $\zeta^{(k)}$ is the normalized frequency offset ($\zeta^{(k)} = \Delta f^{(k)}/\Delta F$, $-0.5 < \zeta^{(k)} < 0.5$).

The synchronization method or algorithm of this embodiment may now continue with generating an interference matrix ($\Gamma$). After OFDM demodulation (e.g., N-point FFT transform in most cases), the signal on the l-th sub-carrier ($r_l$) is given by:

$$r_l = \sum_{m=-\frac{M}{2}}^{\frac{M}{2}} \sum_{k=0}^{N_{user}-1} \frac{S_m^{(k)} \cdot H_m^{(k)}}{N} \left( \sum_{n=0}^{N-1} e^{j2\pi \frac{(l-m)-\xi^{(k)}}{N} n} \right) \cdot e^{-j\frac{2\pi \cdot m \cdot \tau_k}{N}}$$
Equation 10

If we now let $$I(m, l) = \frac{1}{N} \cdot \sum_{n=0}^{N-1} e^{j2\pi \frac{(l-m)-\xi^{(k)}}{N} n} \cdot e^{-j2\pi \frac{m \tau_k}{N}},$$

$$k = \arg_k(l \in \Omega^k)$$

Equation 10 becomes:

$$r_l = \sum_{m=-\frac{M}{2}}^{\frac{M}{2}} \sum_{k=0}^{N_{user}-1} S_m^{(k)} H_m^{(k)} \cdot I(m, l)$$
Equation 11

From Equation 4, we know that $$\sum_{k=0}^{N_{user}-1} S_l^{(k)} \cdot H_l^{(k)} = a_l \cdot H_l^{(g)} \text{ and } g = \arg_g(l \in \Omega^g)$$

(the user number g, the sub-carrier set assigned to which include the sub-carrier l)

$$r_l = \sum_{m=-\frac{M}{2}}^{\frac{M}{2}} \sum_{k=0}^{N_{user}-1} S_m^{(k)} \cdot H_m^{(k)} \cdot I(m, l)$$
Equation 12

$$= a_l \cdot H_l^{(\arg(l \in \Omega^g))} \cdot I(l, l) + \sum_{m=-\frac{M}{2}, m \neq l}^{\frac{M}{2}} a_m \cdot H_m^{k}{}^{(\arg(m \in \Omega^{(k)}))} \cdot I(m, l)$$

The first term of the equation above is interpreted as self-distortion (self-interference) due to time delay and frequency offset jointly, and the second term is regarded as the interferences contributed by the other sub-carriers. Then, if we let $$B = [r_0, r_1, \ldots, r_{M-1}]_{1 \times M}^T \text{ and }$$

$$A = \left[ a_0 \cdot H_0^{k}{}^{(\arg(0 \in \Omega^{(k)}))}, a_1 \cdot H_1^{k}{}^{(\arg(1 \in \Omega^{(k)}))}, \ldots, a_{M-1} \cdot H_{M-1}^{k}{}^{(\arg(M-1 \in \Omega^{(k)}))} \right]_{1 \times M}^T$$

and interference matrix $\Gamma_{M \times M}$ whose (m,l)-th element is I(m,l).

Finally, the vector expression of the received signals on the frequency domain is:

$$B = \Gamma A + N$$
Equation 13 where the frequency domain white noise vector $N = [n_0, n_1, \ldots, n_{M-1}]_{I \times M}^T$ and $n_m$ is white noise on the m-th sub-carrier.

The synchronization method or algorithm then continues with generating a correction matrix. According to estimation theory, the inventors applied a least square (LS) algorithm to Equation 13. The correction matrix $\Pi$ is derived from:

$$\Pi = \Gamma^H (\Gamma \Gamma^H)^{-1}$$
Equation 14 and the corrected signal vector A' is:

$$A' = \Pi B$$
Equation 15

The synchronization method may be implemented as described through Equation 15, but in some cases, it is desirable to further optimize the generation of the interference matrix. This may be done in some embodiments by discarding un-used sub-channels. For example, in some communication systems such as those based on IEEE 802.16 (i.e., 802.16d/e), some sub-channels are discarded during one uplink frame transmission (see Equation 2). It is unnecessary to take the terms of the un-used sub-channels in Equation 13. So, the dimension of the vectors in Equation 13 can be reduced from M to $M' = N_{subcarrier} N_{subchannel}$ ($M = M' + N_{discard} N_{subcarrier}$, see Equation 3).

In other cases, the entry calculation can be simplified to optimize the generation of the interference matrix or at least reduce its calculation complexity. According to the definition of I(m,l), every entry of this matrix is a summation of N complex. Fortunately, I(m,l) can be simplified as:

$$I(m, l) = \frac{\sin(\pi(m - l - \xi^{(k)}))}{N \sin\left(\frac{\pi}{N}(m - l - \xi^{(k)})\right)} \cdot e^{-j\pi\left(1 - \frac{1}{N}\right)(m - l - \xi^{(k)})} \cdot e^{-j2\pi \frac{m \tau_k}{N}},$$
Equa. 16

$$k = \arg_k(l \in \Omega^{(k)})$$

Another technique to optimize the generating of the interference matrix by lowering the computational complexity and saving memory is to band the interference matrix $\Gamma$. This is due to the fact that the interference power contributed by the l-th sub-carrier onto the m-th sub-carrier decreases significantly in the function of the distance (|l-m|) on the frequency axis.

$$I(m, l) = \begin{cases} I(m, l) & |m - l| \le d \\ 0 & \text{otherwise} \end{cases} \quad \text{Equation 17}$$

In other embodiments, it may be desirable to further improve the synchronization method, and this may be done by optimizing or improving the inversing matrix. For example, as with the interference matrix, it may be useful to band the inverse matrix. As discussed above, the inverse matrix $\Theta = \Gamma \Gamma^H$ is a banded matrix with a band of d and the selection of d is mainly performed by a network deployment scenario. There is a tradeoff as with a larger d performance is increased but there is more complexity. Qualitatively, a relatively large d can be chosen for a wireless system in which most users are fast moving and/or the sub-carrier spacing is quite narrow (see Equation 9). In one implementation, it is preferred that d=4 be used. For example, in an IEEE802.16d/e implementation, a band d of 4 may be useful because the tile-structure in this implementation has 4 sub-carriers on the frequency domain.

In other cases, it may be desirable to fragment the inverse matrix into two or more matrices with smaller dimensions to reduce computational complexity. As described previously, the computational complexity and memory consumption of inversing matrix $\Theta = \Gamma \Gamma^H$ will increase in terms of the matrix dimensions, which are determined by the number of the used sub-carriers. For instance, in an exemplary worst case maximum, 1680 sub-carriers are used in an IEEE 802.16d system, and its assignment scheme is uploaded every 3 OFDM symbols duration. The complexity and memory usage of inversing a banded matrix with a large number of dimensions could make implementation problematic on a real-time system. With this in mind, an alternative is to fragment the inverse or inversing matrix $\Theta$ into several small-dimensional matrixes:

$$\Theta = \begin{bmatrix} \Theta^0_{P \times P} & & & & \\ & \Theta^1_{P \times P} & & & \\ & & \ddots & & \\ & & & \Theta^{u-1}_{P \times P} & \\ & & & & \Theta_{L \times L} \end{bmatrix}_{M' \times M'} \quad \text{Equation 18}$$

$$u = \left\lfloor \frac{M'}{P} \right\rfloor, L = M' - u \cdot P$$

Therefore, the inverse matrix of $\Theta$ can be approximated by:

$$\Theta^{-1} \approx \quad \text{Equation 19}$$

$$\begin{bmatrix} (\Theta^0_{P \times P})^{-1} & & & & \\ & (\Theta^1_{P \times P})^{-1} & & & \\ & & \ddots & & \\ & & & (\Theta^{u-1}_{P \times P})^{-1} & \\ & & & & (\Theta_{L \times L})^{-1} \end{bmatrix}_{M' \times M'}$$

Figure 2:
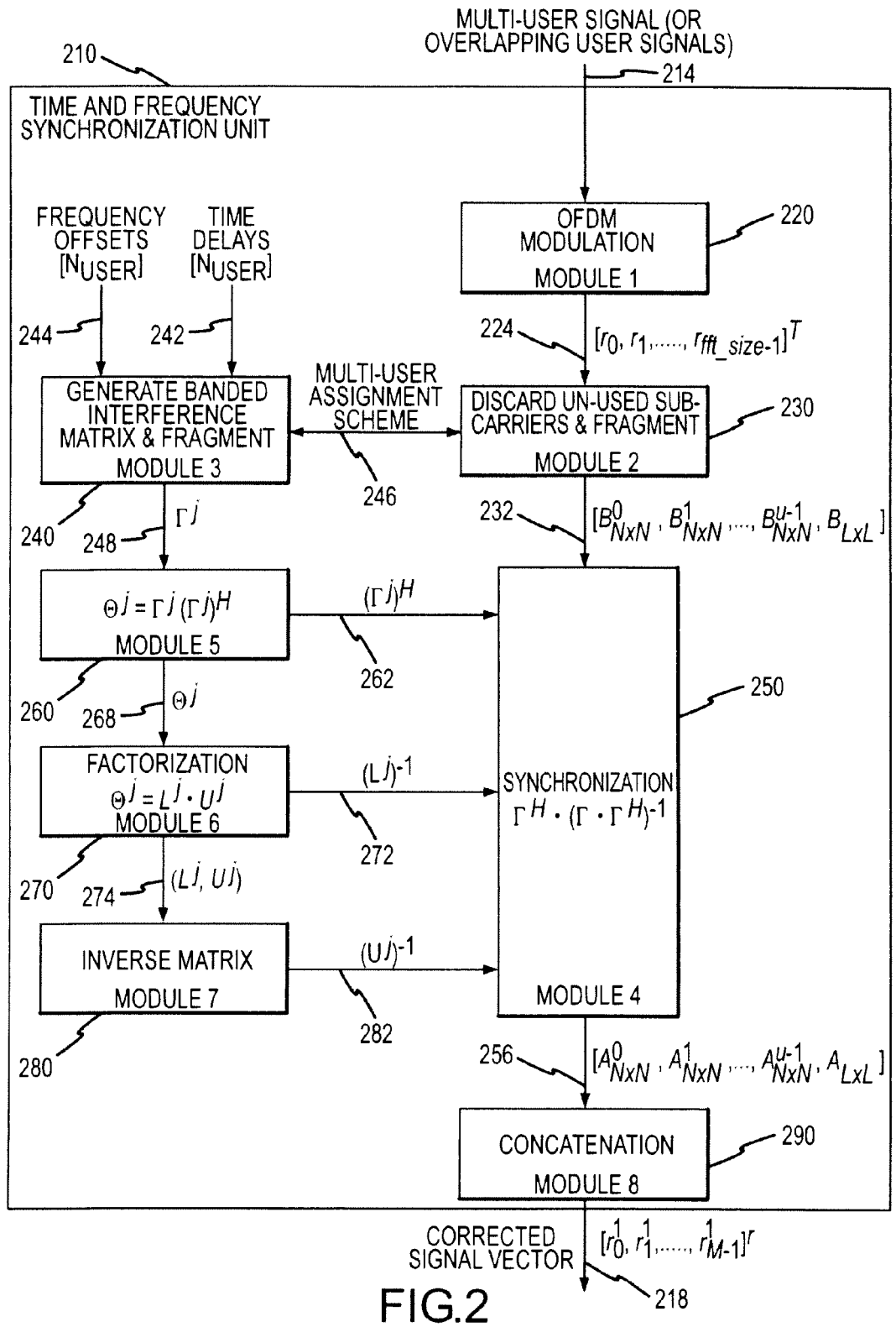
FIG. 2 illustrates an exemplary time and frequency synchronization unit, such as may be used in the OFDMA uplink receiver of the base station of FIG. 1, with its structure and operation shown in block form.

FIG. 2 shows one useful synchronization structure for implementing the synchronization and other techniques of this invention. Specifically, the illustrated structure may be used in an implementation of an uplink receiver by providing the synchronization unit or element (e.g., see elements 124 and 126 of FIG. 1). In FIG. 2, a time and frequency synchronization unit 210 that may be provided as part of an OFDMA receiver or as a separate component in a communication system. The synchronization unit 210 operates to receive user signals 214, e.g., the received signal 214 is an overlapping signal from one or several SSs or client devices, and to process these signals 214 to correct the received multi-user signal 214 for interference, such as MAI. The corrected signal (or signals) or corrected signal vector 218 is output from the synchronization unit 210 and, typically, is provided to an uplink receiver (not shown in FIG. 2) associated with the unit 210 and users or SSs.

The synchronization unit 210 is shown to include a number of modules (i.e., modules 1-8) that provide a function or portion of the synchronization method of the invention. These modules may be implemented through the use of hardware components and/or software that provide the described functionality. As illustrated, the synchronization unit includes a first module 220 that receives the user signals 214 and outputs a demodulated signal 224 to a second module 230, and in most embodiments, this involves applying OFDM demodulation to the user signal 214 (see, for example, Equations 1 to 10). The second module 230 and a third module 240 have access to or receive as input the multi-user scheme 246 for the communication system being supported by the synchronization unit 210 (or its associated uplink receiver).

The second module 230 processes the modulated signal 224 based on the assignment scheme to discard any un-used sub-carriers and/or fragments, which is useful in optimizing later generation of an interference matrix in fourth module 250 (e.g., see discussion of optimizing the generating of the interference matrix above by not bringing sub-channels that are discarded during uplink frame transmission into Equation 13). The user signal 232 that has been modulated and processed for streamline processing by module 230 is passed to the fourth module 250 for cancellation of interference (such as MAI), i.e., the un-used sub-carriers are discarded from the signal vector after OFDM demodulation in module 220. The remaining sub-carriers are segmented into u blocks of P sub-carriers and 1 block of L sub-carriers (in Equation 18). The blocks 232 are serially fed into the synchronization module 250 in which each block (vector) is multiplied by its corresponding correction matrix as provided in the illustrated in FIG. 2 in three sub-matrices 262, 272, 282 by modules 260, 270, 280. Then, these corrected blocks 256 are fed to a final or eighth module 290 where they are concatenated into a signal vector or corrected signal vector 218 that is output from the synchronization unit 210.

The fifth module 260 receives an interference matrix 248. With the knowledge of time delays 242 and frequency offsets 244 of active users and the multi-user assignment scheme 246, the interference matrix 248 is generated by the third module 240 of the synchronization unit 210 (see time delay Equations 7 and 8 and frequency offset Equation 9, and generated by Equation 16). Module 260 may operate to band the interference matrix 248 as discussed with reference to Equation 17 after entries corresponding to the un-used sub-carriers are discarded. The matrix 268 (e.g., several smaller dimension matrices as discussed with reference to Equation 18) output to the sixth module 270 is banded and segmented into it banded matrices of P×P dimension and 1 banded matrix of L×L dimension. The sixth module 270 acts to factorize the matrix 268 and outputs its results 274 to a seventh module 280 that generates an inverse matrix, as is discussed with reference to Equation 19. Then, as shown, the banded correction matrix $\Theta^j$ corresponding to the banded interference matrix $\Gamma^j$ (shown at 248) can be output by 3 matrixes $(\Gamma^j)^H$, $(L^j)^{-1}$, and $(U^j)^{-1}$ (shown at 262, 272, 282 from modules 260, 270, 280).

As shown in FIG. 3, a correction module 350, such as module 250 in FIG. 2, can be turned into a cascade equivalent structure to greatly lower computational complexity. As shown, segmented user blocks 332 (such as generated by modules 220 and 230 of FIG. 2) have three correction matrices 360, 370, 380 applied in a cascaded fashion with outputs 364, 374 being fed to the next correction module or matrix until the corrected user blocks 356 is output from the correction element (such as for further processing including concatenation as shown in FIG. 2). Note that as $(\Gamma^j)^H$ is a banded matrix, the multiplication of $(\Gamma^j)^H$ in the third correction matrix or module 380 is simplified or less complex. As shown, segmented user blocks are cascaded through a factorized matrix 360, an inverse matrix 370, and then an interference matrix 380 and correction is made without requiring multiplying two matrices.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for synchronizing multiple user signals that overlapped on the time domain in a multi-user communication system, comprising:
   generating an interference matrix based on active user time delay information, active user frequency offset information and a multi-user assignment scheme for active users in the multi-user communication system;
   receiving a multi-user signal from the active users;
   segmenting the multi-user signal into a plurality of blocks; and
   applying the interference matrix to each of the blocks.

2. The method of claim 1, further comprising prior to the segmenting of the multi-user signal, demodulating the received multi-user signal, identifying un-used sub-carriers in the demodulated multi-user signal, and discarding the un-used ones of the sub-carriers.

3. The method of claim 1, wherein the applying of the interference matrix comprises generating a correction matrix by applying a least square algorithm to the interference matrix and then multiplying each of the blocks by the correction matrix.

4. The method of claim 1, wherein the applying of the interference matrix comprises multiplying each of the blocks by the interference matrix.

5. The method of claim 4, further comprising generating a factorization matrix by factoring a correction matrix generated from the interference matrix, the method further comprising multiplying each of the blocks by the factorization matrix.

6. The method of claim 5, further comprising generating an inverse matrix based on the factoring of the correction matrix, the method further comprising multiplying each of the blocks by the inverse matrix.

7. The method of claim 6, further comprising concatenating the blocks after the multiplying by the matrices to create a corrected signal vector.

8. The method of claim 1, wherein the interference matrix is a banded matrix with a band selected to reduce computational complexity.

9. A method for time and frequency synchronization for use in a multi-user, interleaved orthogonal frequency division multiple access (OFDMA) uplink receiver, comprising:
   generating a correction factor matrix based on active user time delays and active user frequency offsets for active users associated with the uplink receiver;
   performing orthogonal frequency division multiplexing (OFDM) demodulation of a signal vector from the active users;
   generating a set of blocks from the demodulated signal vector by discarding un-used sub-carriers in the demodulated signal vector; and
   multiplying each of the blocks by the correction factor.

10. The method of claim 9, wherein the correction factor comprises a set of matrices including an interference matrix generated based on the time delays and the frequency offsets and the multiplying of each of the blocks by the correction factor comprises multiplying each of the blocks by each of the matrices.

11. The method of claim 10, wherein the set of matrices further includes a factorization matrix generated based on the interference matrix.

12. The method of claim 11, wherein the set of matrices further includes an inverse matrix generated based on the factorization matrix.

13. The method of claim 10, wherein dimensions of the interference matrix are reduced by discarding the un-used sub-carriers.

14. The method of claim 10, wherein the interference matrix is a banded matrix having a band of four to reduce computational complexity.

15. The method of claim 9, further comprising after the multiplying of each of the blocks, concatenating the blocks to create a corrected signal vector.

16. A synchronization apparatus for an interleaved OFDMA uplink receiver for use in a wireless digital communication system, comprising:
   a module processing a multi-user signal vector producing a plurality of blocks by removing un-used sub-carriers based on user assignments in the communication system;
   a module sequentially outputting corrected blocks by multiplying each of the blocks by a correction factor generated based on active user time delay information and active user frequency offset information for active users and to concurrently correct for time delays and frequency offsets for active users in the communication system; and
   a module concatenating the corrected blocks to produce a corrected signal vector, wherein at least one of the modules is a hardware module.

17. The apparatus of claim 16, wherein the correction factor comprises an interference matrix generated based on the time delays and the frequency offsets for active users in the communication system.

18. The apparatus of claim 17, wherein the correction factor further comprises a factorization matrix formed by factoring a correction matrix generated from the interference matrix and an inverse matrix formed based on the factoring of the correction matrix and wherein the module outputting the corrected blocks multiplies each of the blocks by the interference matrix, the factorization matrix, and the inverse matrix.

19. The apparatus of claim 17, wherein the interference matrix is a banded matrix configured to cancel multiple access interference in the user signal vector.

20. The apparatus of claim 17, wherein the interference matrix does not include terms associated with the un-used sub-carriers.

* * * * *

UNITED STATES PATENT AND TRADEMARK OFFICE
CERTIFICATE OF CORRECTION

| | | |
|---|---|---|
| PATENT NO. | : 8,514,774 B2 | Page 1 of 1 |
| APPLICATION NO. | : 11/676914 | |
| DATED | : August 20, 2013 | |
| INVENTOR(S) | : Yiqun Ge et al. | |

It is certified that error appears in the above-identified patent and that said Letters Patent is hereby corrected as shown below:

On the title page, item (30), "2006 1 0009351" should be --2006 1 0009351.4--

In the Claims

Column 14, line 47, "is" should be --comprises--

Signed and Sealed this
First Day of April, 2014

Michelle K. Lee
*Deputy Director of the United States Patent and Trademark Office*